No. 704,313. Patented July 8, 1902.
B. M. GERARDIN.
RULE.
(Application filed Oct. 17, 1901.)
(No Model.)
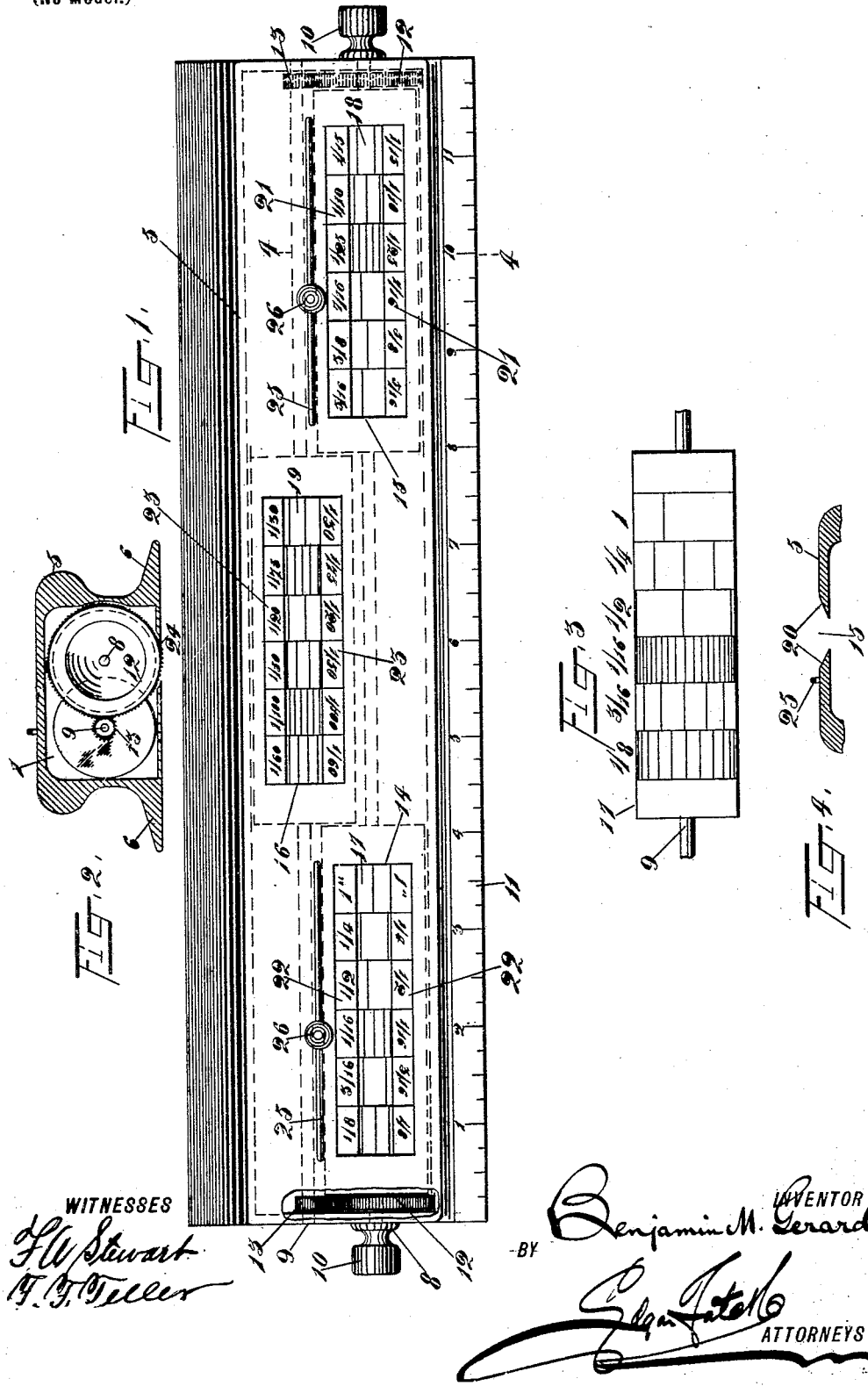
WITNESSES
INVENTOR
Benjamin M. Gerardin
BY
ATTORNEYS

UNITED STATES PATENT OFFICE.

BENJAMIN M. GERARDIN, OF JERSEY CITY, NEW JERSEY.

RULE.

SPECIFICATION forming part of Letters Patent No. 704,313, dated July 8, 1902.

Application filed October 17, 1901. Serial No. 79,023. (No model.)

*To all whom it may concern:*

Be it known that I, BENJAMIN M. GERARDIN, a citizen of the United States, residing at Jersey City, in the county of Hudson and State of New Jersey, have invented certain new and useful Improvements in Rules, of which the following is a full and complete specification, such as will enable those skilled in the art to which it appertains to make and use the same.

The object of this invention is to provide an improved rule comprising an oblong casing having one or more straight edges and provided with a plurality of shafts each of which is provided with one or more scale-cylinders, the casing being provided in the top with slots or openings corresponding with said scale-cylinders and with a scale-index, whereby the scales on the cylinders may be read or determined, said shafts being geared in connection and being adapted to be turned by moving the rule bodily over a surface on which parallel lines are to be drawn, a further object being to provide a rule embodying the features of construction specified and by means of which space-lines may be drawn on any desired surface and the spaces between which are much less than the scale-spaces indicated on the scale-cylinders; and with these and other objects in view the invention consists in a rule constructed as hereinafter described and claimed.

In the drawings forming part of this specification, in which the separate parts of my improvement are designated by the same reference characters in each of the views, Figure 1 is a plan view of my improved rule; Fig. 2, a transverse section of one end thereof; Fig. 3, a plan view of one of the scale-cylinders which I employ, and Fig. 4 a transverse section of the top portion of the casing only on the line 4 4 of Fig. 1.

In the practice of my invention I provide an oblong casing 5, the bottom of which is provided with side flanges 6, and said casing is also provided with a longitudinal chamber 7, through which passes two longitudinal shafts 8 and 9. The shaft 8 is provided at its opposite ends with knobs or handles 10, by which it may be turned, and one of the baseflanges 6 is provided with an ordinary scale 11, which represents inches and fractions thereof. The shaft 8 is provided at one or both ends with a gear-wheel 12, and the shaft 9 is similarly provided at one or both ends with a smaller wheel or pinion 13, and by turning the shaft 8 by means of the knob or handle 10 at either end thereof the shaft 9 will be also turned, it being understood that the shaft 9 will be turned a greater number of times than the shaft 8, and in practice I prefer to proportion the gear-wheels 12 and 13 so that the shaft 9 will be turned four times for each revolution of the shaft 8. The casing 5 is provided in the form of construction shown in the drawings with two oblong slots or openings 14 and 15, adjacent to the opposite ends thereof, and with a central slot or opening 16, said first-named slots or openings 14 and 15 being directly over the shaft 8 and the slot or opening 16 being directly over the shaft 9, and said shaft 8 is also provided with two scale-cylinders 17 and 18, which are placed, respectively, beneath the slots or openings 14 and 15, and the shaft 9 is provided with a similar scale-cylinder 19. The opposite edges of the slot or opening 15 are beveled, as shown at 20 in Fig. 4, and on these beveled surfaces are placed a scale-index 21, said scale-index being the same at both sides of the slot or opening 14. The slot or opening 14 is also beveled at the opposite sides thereof, and placed thereon is a scale-index 22, while the slot or opening 16 is similarly formed at its opposite sides and provided with a scale-index 23. The scale-cylinder 17, beneath the slot or opening 14, is divided into six subdivisions, and these subdivisions are provided with longitudinal lines forming scales which represent, beginning with the left, one-eighth of an inch, three-sixteenths of an inch, one-sixteenth of an inch, one-half of an inch, and one-fourth of an inch, and one inch, which correspond with the index 22 at the opposite sides of the slot or opening 14. The scale-cylinder 18, beneath the slot or opening 15, is also divided into six subdivisions, as shown in Fig. 1, and these subdivisions are provided with parallel scale-marks which represent, beginning with the left end of said cylinder, five-sixteenths of an inch, five-eighths of an inch, seven-sixteenths of an inch, one twenty-fifth of an inch, one-tenth of an inch, and one-fifteenth of an inch, and these scale-marks correspond with the scale-index at the opposite sides of said slot or opening. The scale-cylinder 19 of the shaft 9 is also divided into six subdivisions, and said subdivisions are provided with parallel scale marks or lines which represent one-sixtieth of an inch, one one-hundredth of an inch, one-fiftieth of an inch, one-twentieth of an inch, one seventy-fifth of an inch, and one-thirtieth of an inch, and these correspond with the scale-index at the opposite sides of said slot or opening.

It will be understood that the spaces between the scale-marks on the cylinder 19 when the shaft 9 turns four revolutions for each revolution of the shaft 8 are four times as great as the space indicated by the scale-index at the opposite sides of the slot or opening 16, and the said scale-index determines the space between the lines drawn on any surface which it is desired to rule, it being understood that for the purposes of this description the diameters of the cylinders are also as one to four, or, in other words, the spaces between the lines drawn on any surface which it is desired to rule when the cylinder 19 is used will be one-quarter the distance between the scale-lines on said cylinder and will be correctly indicated by the scale-index on the opposite sides of the slot or opening 16.

In the form of construction shown in the drawings the gear-wheels 12 at the opposite ends of the shaft 8 extend through the bottom of the casing 5, as shown at 24 in Fig. 1, and the said cylinder may therefore be turned by simply moving the rule bodily across the surface on which it is placed; but it will also be understood that the said cylinders may be turned and adjusted by the knob or handle at either end of said shaft 8.

The operation will be readily understood from the foregoing description when taken in connection with the accompanying drawings and the following statement thereof. Either side or edge of the device may be used as a straight or rule edge, and if it is desired to draw lines one-eighth of an inch apart the scale-cylinder 17 is used and said cylinder is set approximately as shown in Fig. 1, and by moving the device bodily across the surface which it is desired to rule lines one-eighth of an inch apart may be drawn, as will be readily understood, and this is true of all the subdivisions of the scale on the cylinder 17, and the foregoing is also true of the scale-cylinder 18, it being understood that the distance between the lines drawn on the surface to be ruled when either of these scales is employed is indicated by the scale-index at the opposite sides of the slots or openings beneath which said cylinders are placed. If it is desired to draw lines the spaces between which are indicated by the index at the opposite sides of the slot or opening 16, the cylinder 19 is used and the device is operated in the same manner as hereinbefore described. If the lines are to be one-sixtieth of an inch apart, the device is moved so that the cylinder 19 will turn through one of the scale-spaces at the left-hand end thereof, these spaces being one-sixteenth of an inch apart, or approximately four times the amount indicated by the corresponding scale-index, and this is true of all the subdivisions of the scale on the cylinder 19.

In Fig. 1 I have shown the top of the casing 5, adjacent to the slots or openings 14 and 15, as provided with a rod 25, on each of which is mounted a slide 26, and in practice these slides may be moved opposite to any subdivision of the scale-index adjacent thereto, the object of this construction being to hold the attention to the subdivision of the scale which is being used.

Having fully described my invention, what I claim as new, and desire to secure by Letters Patent, is—

1. A scale comprising an oblong casing provided with a plurality of longitudinal shafts geared in connection so that one of said shafts will turn more rapidly than the other, said casing being also provided in the top thereof with a plurality of slots or openings and said shafts being provided with scale-cylinders beneath said slots or openings, and said slots or openings being provided at one side thereof with a scale-index, substantially as shown and described.

2. A rule comprising an oblong casing having a plurality of shafts mounted therein longitudinally thereof and geared in connection in such manner that one of said shafts will turn more rapidly than the other, said casing being also provided in the top thereof over said shafts with slots or openings having a scale-index at the sides thereof, and scale-cylinders mounted on said shafts beneath said slots or openings substantially as shown and described.

3. A scale comprising an oblong casing provided with a plurality of longitudinal shafts geared in connection so that one of said shafts will turn more rapidly than the other, said casing being also provided in the top thereof with a plurality of slots or openings and said shafts being provided with scale-cylinders beneath said slots or openings and said slots or openings being provided at the sides thereof with a scale-index, one of said shafts being also projected through both ends of the casing and being provided at both ends with a knob or handle, substantially as shown and described.

In testimony that I claim the foregoing as my invention I have signed my name, in presence of the subscribing witnesses, this 16th day of October, 1901.

BENJAMIN M. GERARDIN.

Witnesses:
F. A. STEWART,
F. F. TELLER.